United States Patent Office 2,782,014
Patented Feb. 19, 1957

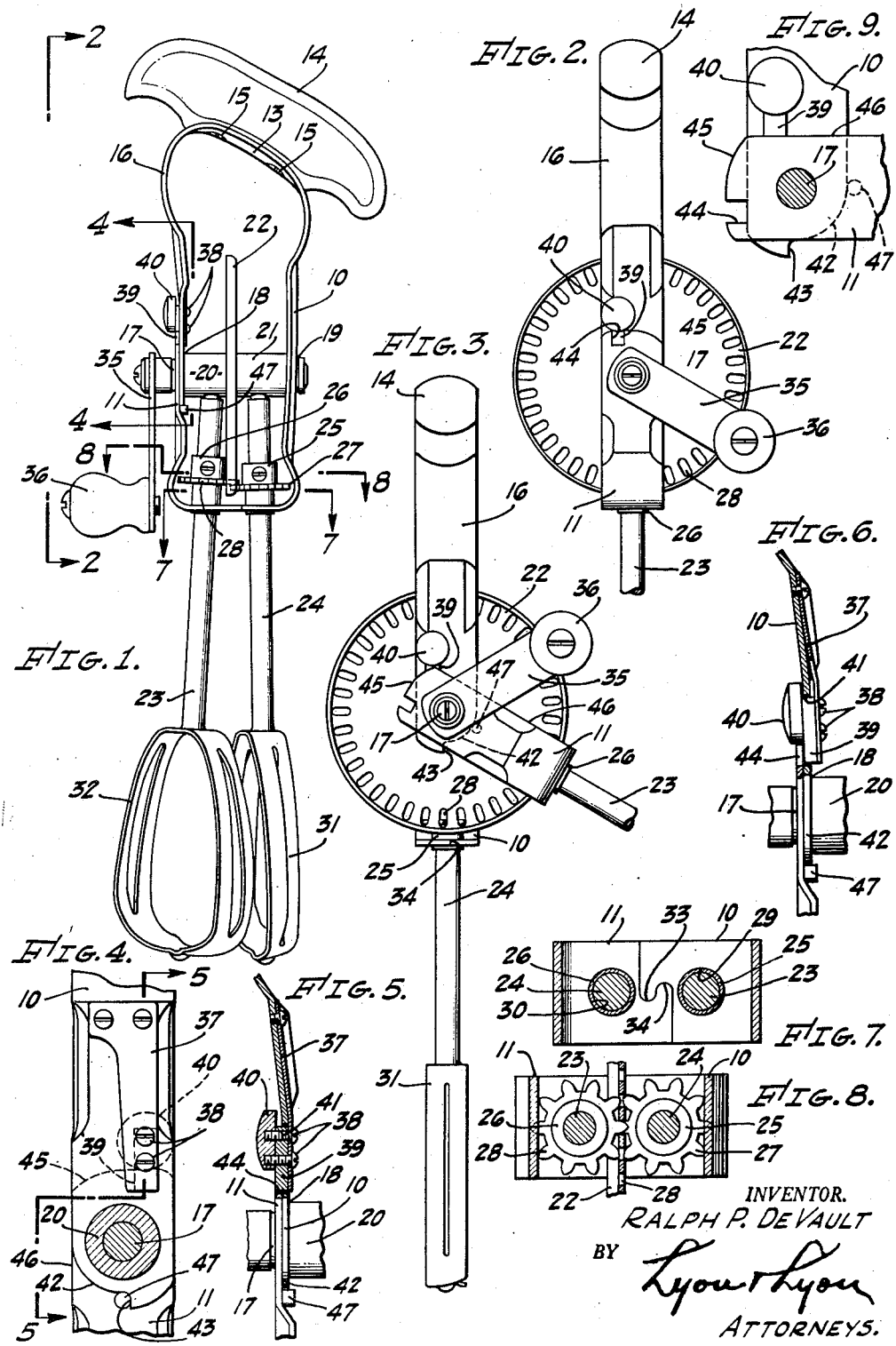

2,782,014

EGG BEATER

Ralph P. De Vault, Arcadia, Calif.

Application September 6, 1955, Serial No. 532,390

3 Claims. (Cl. 259—131)

This invention relates to improvements in egg beaters and more particularly to an egg beater of the same general type as that shown in my prior United States Patent No. 2,499,371, patented March 7, 1950.

The egg beater of my prior patent was characterized primarily by the fact that two frame members were provided pivotally about a shaft, each of which frame members mounted a beater shaft carrying a separate beater and the pivoting of the frame members in either direction about the central shaft resulted in a separation of the beaters to facilitate cleaning.

The present invention relates to the same general type beater as that of my prior patent but differs therein in various aspects.

The most significant difference between the present invention and my prior patent lies in the fact that unique means are incorporated in the present invention for positively latching the two separate frame members in their two extreme positions.

A second feature of distinction between the present invention and the device of my prior patent lies in the fact that in the device of my prior patent the handle member was formed in two parts whereas in the present invention the handle member is unitary and does not separate into two parts when the beaters are separated.

By means of the feature of a latch for positively locking the beaters in their separated position, I have made it possible to use the beater as a single-bladed beater or as a double-bladed beater according to choice.

These and other features, objects and advantages of the invention will be apparent from the next specification in which:

Figure 1 is a front elevation of an egg beater embodying the present invention.

Figure 2 is a view taken along the line 2—2 of Figure 1.

Figure 3 is a fragmentary side elevation of the beater in its open position.

Figure 4 is a section taken along the line 4—4 of Figure 1.

Figure 5 is a section taken along the line 5—5 of Figure 4.

Figure 6 is a view similar to Figure 5 showing the latch disengaged.

Figure 7 is a section taken along the line 7—7 of Figure 1.

Figure 8 is a section taken along the line 8—8 of Figure 1.

Figure 9 is an enlarged fragmentary detail of the latch mechanism and pivoting frame members.

Referring now more particularly to the drawings, there is provided a frame including a pair of metal strips 10 and 11. The upper end of the strip 10 is bent over as at 13 and a handle 14 is affixed thereto as by screws 15. The strip 10 is bent downwardly as at 16 and pivotally mounted on shaft 17 adjacent one end thereof as at 18 while the other side of the strip 10 is pivoted to the shaft 17 as at 19. The strip 11 is also pivoted to the shaft 17 as indicated. A pair of spacers 20 and 21 surround the shaft 17 and a gear 22 is keyed thereto. Each of the spacers is bored to receive the upper reduced ends of beater shafts 23 and 24, which shafts are provided with collars 25 and 26 carrying gears 27 and 28 meshing with the gear 22. The shafts 23 and 24 pass through holes 29 and 30 respectively in the lower flattened portions of the strips 10 and 11 and carry beater elements 31 and 32 at their extreme ends.

The beater elements 31 and 32 may be conventional but preferably they are formed in the manner set forth in my co-pending application, Serial No. 511,565 filed May 27, 1955, and entitled "Beater agitator."

The two strips 10 and 11 have mating notches 33 and 34 attached to interlock when the frame members are in the closed position.

The shaft 17 has affixed thereto a crank 35 carrying a handle 36. Strip 10 in its left-hand portion as shown in Figure 1 carries a spring member 37 to which is affixed as by screws 38 a detent 39 to which is mounted a thumb contact 40. An opening 41 is provided in the strip 10 adjacent the detent 39. The lower end of the strip 10 has a cam face 42 provided with a shoulder 43 while the upper end of the strip 11 is provided with a notch 44 and a rounded surface 45 communicating with the straight line surface 46. The strip 11 also carries a lug or post 47 attached to ride upon the cam face 42 and engage the shoulder 43 as illustrated in Figure 9.

It will be appreciated that when the beater is in its closed position the lug 47 will engage the shoulder 43 and the detent 39 will be forced under the force of the spring 37 into the notch 44, thus securing dogging or locking the beater. When it is desired to separate two blades the operator will press upon the thumb contact 40, disengaging the detent 39 from the notch 44 and permitting the relative pivoting of the strips 10 and 11. As the strip 11 begins to assume position at right angles to the strip 10 the detent 39 engages the flat or straight surface of the strip 11 and thus serves as a second dogging or latching mechanism to hold the two frame members in their extreme separated position.

As thus separated, either one of the beaters can be used as a single beater for turning of the crank 35 and cause both of the beaters to be driven as in pivoting from one position to the other, one or the other of the gears 27 or 28 will merely ride over the surface of the gear 22 remaining in operative contact therewith.

While there has been described what is at present considered the preferred embodiment of the invention, it will be understood that various changes and alterations may be made therein without departing from the essence of the invention and it is intended to cover herein all such changes and alterations as come within the true scope and spirit of the annexed claims.

I claim:

1. An egg beater comprising a pair of frame members each separately pivoted on a shaft; a pair of beater shafts each separately pivotally mounted in a separate one of said frame members and each carrying a separate beater; a pair of gears each separately mounted on one of said beater shafts; a gear carried by said shaft and meshing with said pair of gears; one of said frame members being pivoted on said shaft at a point remote from one portion of said other frame member and immediately adjacent another portion of said other frame member; latch means carried by the adjacent ends of said frame members and operative to lock said frame members in their extreme positions and crank means operative to drive said shaft to rotate said beaters.

2. An egg beater comprising a pair of frame members each separately pivoted on a shaft; a pair of beater shafts each separately pivotally mounted in a separate one of said frame members and each carrying a separate beater; a pair of gears each separately mounted on one of said beater shafts; a gear carried by said shaft and meshing with said pair of gears; one of said frame members being pivoted on said shaft at a point remote from one portion of said other frame member and immediately adjacent another portion of said other frame member; latch means carried by the adjacent ends of said frame members and operative to lock said frame members in their extreme positions and crank means operative to drive said shaft to rotate said beaters; said latch means comprising a spring mounted detent on one of said frame members and a notch in the other frame member adapted to releasably receive said detent.

3. An egg beater comprising a pair of frame members each separately pivoted on a shaft; a pair of beater shafts each separately pivotally mounted in a separate one of said frame members and each carrying a separate beater; a pair of gears each separately mounted on one of said beater shafts; a gear carried by said shaft and meshing with said pair of gears; one of said frame members being pivoted on said shaft at a point remote from one portion of said other frame member and immediately adjacent another portion of said other frame member; latch means carried by the adjacent ends of said frame members and operative to lock said frame members in their extreme positions and crank means operative to drive said shaft to rotate said beaters; said latch means comprising a spring mounted detent on one of said frame members and a notch in the other frame member adapted to releasably receive said detent in one position of said frame members, said detent being adapted to releasably engage a straight side of said other frame member in the other extreme position of said frame members.

References Cited in the file of this patent

UNITED STATES PATENTS

| | | |
|---|---|---|
| 2,061,868 | Fitzgerald | Nov. 24, 1936 |
| 2,499,371 | De Vault | Mar. 7, 1950 |